(12) United States Patent
Plourde et al.

(10) Patent No.: US 7,597,607 B2
(45) Date of Patent: Oct. 6, 2009

(54) MAGNETIC RECORDING TAPE EDGE PROCESSING

(75) Inventors: Douglas R. Plourde, Somerset, WI (US); William R. Qualls, River Falls, WI (US); Kerry D. Reimer, Hugo, MN (US); Siu-Yue Tam, Arden Hills, MN (US)

(73) Assignee: Imation Corp., Oakdale, MN (US)

( * ) Notice: Subject to any disclaimer, the term of this patent is extended or adjusted under 35 U.S.C. 154(b) by 177 days.

(21) Appl. No.: 11/403,308

(22) Filed: Apr. 12, 2006

(65) Prior Publication Data

US 2007/0242331 A1 Oct. 18, 2007

(51) Int. Cl.
*B24B 1/00* (2006.01)

(52) U.S. Cl. .................... 451/54; 451/28; 451/296; 451/302; 451/305

(58) Field of Classification Search .............. 451/41, 451/53, 56, 60, 287, 288, 291, 270, 28, 54, 451/296, 302, 305
See application file for complete search history.

(56) References Cited

U.S. PATENT DOCUMENTS 4,858,265 A * 8/1989 Suzuki et al. ............... 15/100
5,164,243 A * 11/1992 Kanazawa et al. .......... 428/192
5,827,499 A    10/1998 Metz et al.
5,876,270 A *  3/1999 Honma et al. .............. 451/59
6,013,220 A    1/2000 Iwasaki
6,338,896 B1 * 1/2002 Meguro et al. ............. 428/323
7,101,258 B2 * 9/2006 Ising .............................. 451/7
2003/0188612 A1 10/2003 Kobayashi et al.
2005/0260457 A1 11/2005 Yoshida et al.

OTHER PUBLICATIONS

Applicants' Cover Letter Describing EAVF & EADF Information.
Co-pending U.S. Appl. No. 11/403,284, Siu-Yue Tam et al., filed Apr. 12, 2006, entitled "Edge Profile of a Magnetic Recording Tape".

* cited by examiner

*Primary Examiner*—Joseph J Hail, III
*Assistant Examiner*—Shantese McDonald
(74) *Attorney, Agent, or Firm*—Eric D. Levinson

(57) ABSTRACT

A method for manufacturing magnetic recording tape includes applying a front coat including a magnetic component to a substrate to provide a coated substrate. The coated substrate defines a first face and an opposing, second face, the first face extending between a first corner and an opposing, second corner, and the second face extending between a third corner and an opposing, fourth corner. An abrasive surface is moved against the first corner of the coated substrate to abrasively remove a volume of material from the first corner. In particular, the abrasive surface is angularly offset at a substantially non-orthogonal angle from the first face of the coated substrate.

17 Claims, 9 Drawing Sheets

MAGNETIC RECORDING TAPE EDGE PROCESSING

CROSS-REFERENCE TO RELATED APPLICATION

The present application is related to U.S. patent application Ser. No. 11/403,284, entitled "EDGE PROFILE OF A MAGNETIC RECORDING TAPE," referenced as 10533US01, filed on Apr. 12, 2006, and the contents of which are incorporated herein by reference.

THE FIELD OF THE INVENTION

The present invention generally relates to magnetic recording tape edge processing, and more particularly to abrasive edge processing of magnetic recording tape.

BACKGROUND OF THE INVENTION

Magnetic recording tape generally includes a magnetic layer coated onto at least one side of a non-magnetic substrate (e.g., a non-magnetic, polymeric film). The magnetic coating defines a recording surface and is configured to record and store information. The magnetic coating is optionally formed as a single layer directly on the non-magnetic substrate. A dual-layer construction can also be employed, with the magnetic coating including a lower support layer formed on the substrate and a thin magnetic recording layer, in turn, formed on the lower support layer, for example. The two layers can be deposited on the substrate in a number of ways, for example, simultaneous and/or sequential web coating methods. Magnetic recording tapes can also include backside coatings applied to the substrate opposite the magnetic recording layer. Generally, formulations for the coatings include pigments dispersed in binder systems.

When forming the layers, the various coating compositions can be combined with a suitable solvent to create a homogenous mixture, which can then be coated onto the substrate. The solvent is removed, the coatings are cured, and the coated substrate is calendared if desired. Typically, a full-width coated stock roll is at some point slit into final format widths. During slitting, slit edges are formed on each side of the magnetic recording tape. Unfortunately, quality and/or shapes of the slit edges as formed during slitting are not optimal.

SUMMARY OF THE INVENTION

Some aspects of the present invention relate to a method for manufacturing magnetic recording tape. The method includes applying a front coat including a magnetic component to a substrate to provide a coated substrate. The coated substrate defines a first face and an opposing, second face, the first face extending between a first corner and an opposing, second corner, and the second face extending between a third corner and an opposing, fourth corner. An abrasive surface is moved against the first corner of the coated substrate to abrasively remove a volume of material from the first corner. In particular, the abrasive surface is angularly offset at a substantially non-orthogonal angle from the first face of the coated substrate.

Other aspects of the present invention relate to a method of forming a length of magnetic recording tape. The method includes coating a substrate with a coating to provide a coated substrate. The coated substrate is adapted to record and defines a length, a top face, and an opposing, bottom face. The coated substrate is cut to form a first edge along the length of coated substrate and a second edge along the length of the coated substrate. The first edge is abraded with a moving abrasive surface disposed at a substantially non-orthogonal angle to the top face of the coated substrate, including removing a volume of the coating proximate the first edge.

Yet other aspects of the present invention relate to an edge processing system for magnetic recording tape. The system includes a support member, a first abrasive assembly, and a second abrasive assembly. The support member defines a top surface configured to reinforce a length of magnetic recording tape as the tape travels over the top surface. Each of the first and second abrading assemblies includes a feed reel, a take-up reel, and a guide member. The feed reel and the take-up reel are for moving a length of abrasive film between the feed reel and the take-up reel along a film path. The guide member defines a guide surface along the film path such that the abrasive film moves over the guide surface to define an abrasive surface for abrading an edge of the magnetic recording tape. The first abrasive assembly and the second abrasive assembly are positioned in an opposing manner with the first abrasive assembly on a first side of the support member for abrading a first edge of the magnetic recording tape and the second abrasive assembly on a second side of the support member for abrading a second edge of the magnetic recording tape.

BRIEF DESCRIPTION OF THE DRAWINGS

The accompanying drawings are included to provide a further understanding of the present invention and are incorporated as a part of this specification. Other embodiments and intended advantages of the present invention should be appreciated with reference to the drawings and the corresponding detailed description that follows. The elements of the drawings are not necessarily to scale and like reference numerals designate corresponding similar parts.

DETAILED DESCRIPTION OF THE PREFERRED EMBODIMENTS

Figure 1:
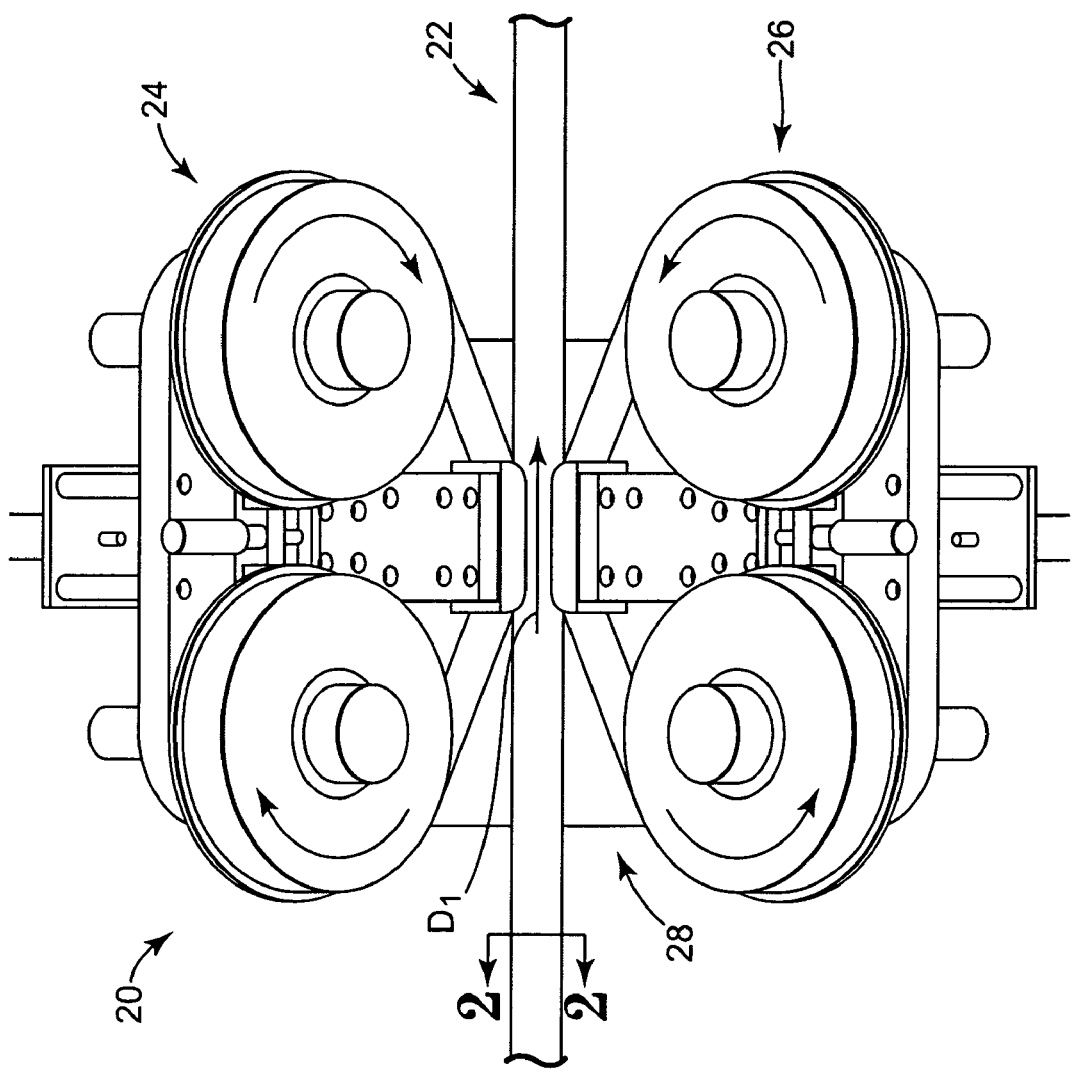
FIG. 1 is a top view of an edge processing system in accordance with principles of the present invention.

FIG. 1 illustrates an edge processing system 20 for processing magnetic recording tape 22 according to principles of the present invention. The system 20 includes a first abrading assembly 24, a second abrading assembly 26, and a tape support assembly 28. In general terms, the first and second abrading assemblies 24, 26 are disposed in an opposing fashion such that the first and second abrading assemblies 24, 26 are positioned to abrasively engage the tape 22 as it travels in a direction $D_1$ over the support assembly 28 and along a tape path.

Figure 2:
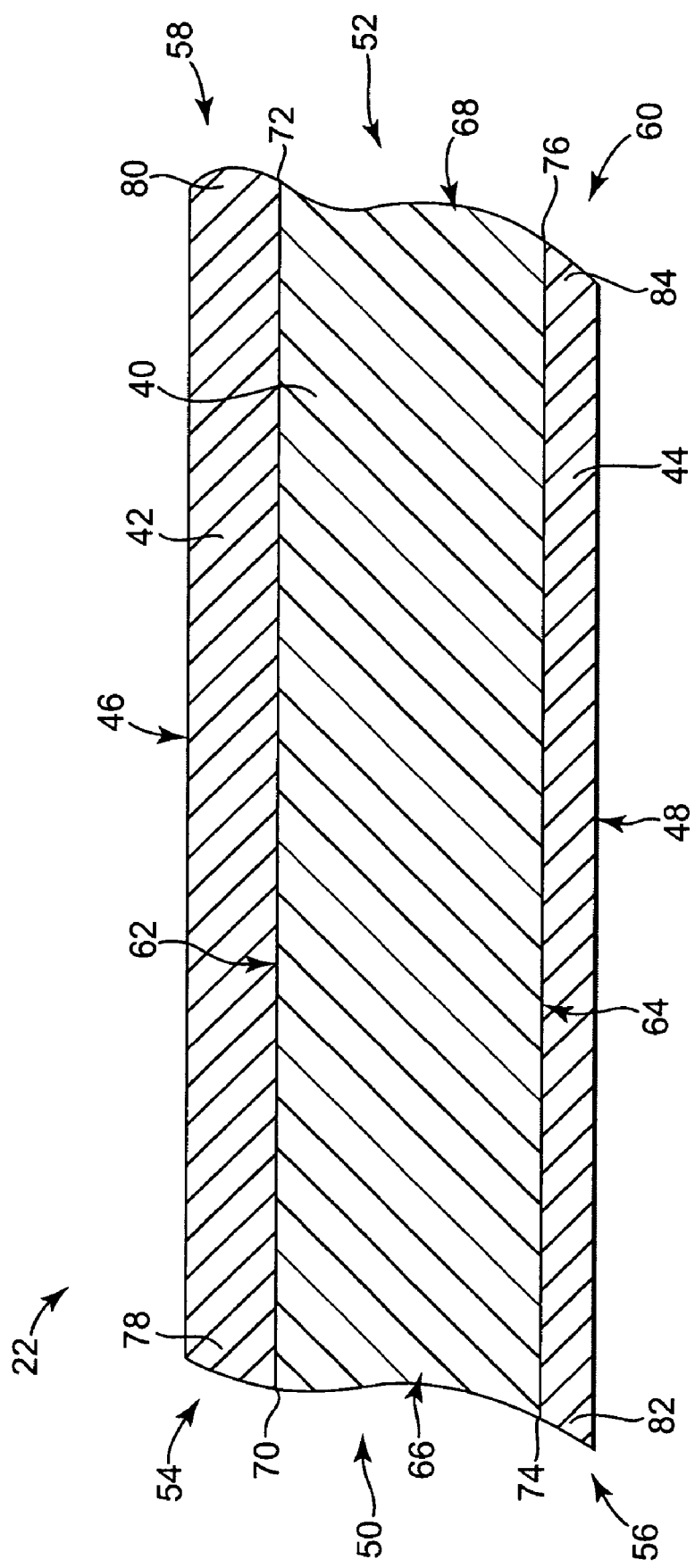
FIG. 2 is a cross-sectional view of an unprocessed length of magnetic recording tape in accordance with principles of the present invention.

With reference to FIG. 2, the tape 22 is a magnetic recording tape and includes a substrate 40 having a front coat 42 and a back coat 44 formed over the substrate 40. The tape 22 extends for a length and defines a top face 46 and an opposing back face 48. The tape 22 also defines a width bounded by a first edge 50 and a second edge 52. The first edge 50 forms a top corner 54 and a bottom corner 56. Similarly, the second edge 52 also forms a top corner 58 and a bottom corner 60.

The substrate 40 has a length and defines a front face 62 and a back face 64. The substrate 40 extends between a first edge 66 and a second edge 68 to define a substrate width. The front face 62 extends to the first edge 66 and terminates at a first terminal end 70. In turn, the front face 62 extends to the second edge 68 and terminates at a second terminal end 72. Similarly, the back face 64 extends to the first and second edges 66, 68 and terminates at a third terminal end 74 and a fourth terminal end 76, respectively.

Generally, the substrate 40 is formed of substantially non-abrasive material. For example, the substrate 40 is optionally formed of materials commonly used in association with magnetic recording tape, including non-magnetic, polymeric materials such as polyethylene naphthalate (PEN).

The front coat 42 is adapted for recording and storing information. With this in mind, the front coat 42 includes a magnetic component (not shown), such as magnetic metal particulate, and is a single-layer or a multi-layer construction. In one embodiment, the front coat 42 includes a portion 78 proximate the first terminal end 70. Though not shown in FIG. 2, the portion 78 optionally protrudes beyond the terminal end 70. The front coat 42 also includes a portion 80 proximate to, and protruding beyond the second terminal end 72 of the front face 62 of the substrate 40. In one embodiment, the portions 78, 80 are shaped during slitting of the magnetic recording tape 22.

In one embodiment, the front coat 42 has surface cracks (not shown) proximate one or both of the first and second edges 50, 52 of the tape 22. The cracks optionally define a "crack front," or substantially continuous line of cracking, at the top face 46 extending along, and proximate to, the first and second edges 50, 52 of the tape 22. In general terms, the cracks either run more or less along the length of the tape 22, more or less into the width of the tape 22, or both.

The back coat 44 is formed over the back face 64 of the substrate 40. The back coat 44 includes a non-magnetic component, for example, a non-magnetic metallic powder. In one embodiment, the back coat 44 includes a portion 82 protruding beyond the third terminal end 74 and a portion 84 proximate the fourth terminal end 76 of the back face 64 of the substrate 40. Though not shown, the portion 84 also optionally protrudes beyond the fourth terminal end 76 of the substrate 40. Once again, the portions 82, 84 are optionally formed during shearing the magnetic recording tape 22, for example, during slitting.

In one embodiment, the back coat 44 has surface cracks (not shown) at the back face 48 of the tape 22 proximate one or both of the first and second edges 50, 52 of the tape 22. Such surface cracking can be generalized as substantially similar to surface cracking described in association with the front coat 42.

Figure 3:
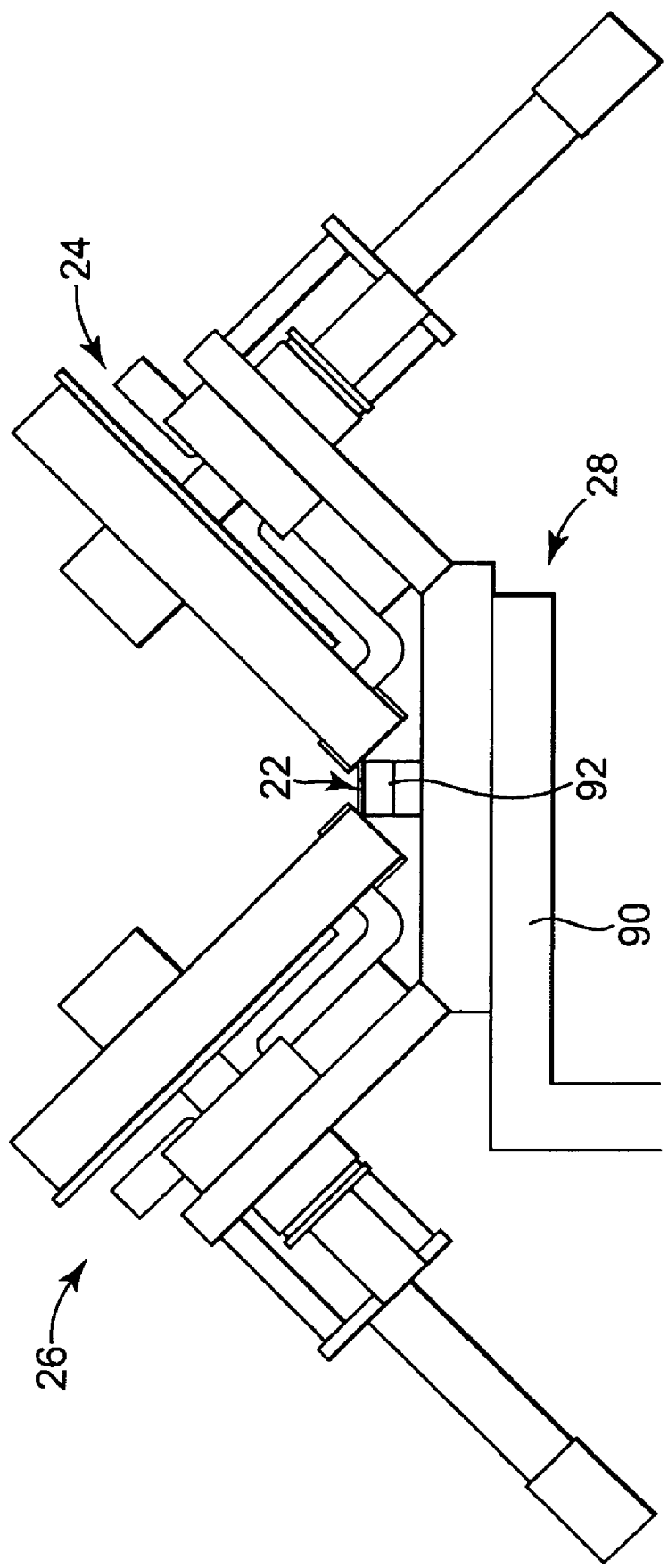
FIG. 3 is a back view of the edge processing system of FIG. 1.

With reference to FIG. 3, the tape support assembly 28 includes a frame member 90 and a support member 92. In general terms, the support assembly 28 is adapted to support the tape 22 as it travels along the tape path between the first and second abrading assemblies 24, 26. In particular, the frame member 90 is adapted to maintain the support member 92 between the first and second abrading assemblies 24, 26 as the tape 22 travels over the support member 92.

Figure 4:
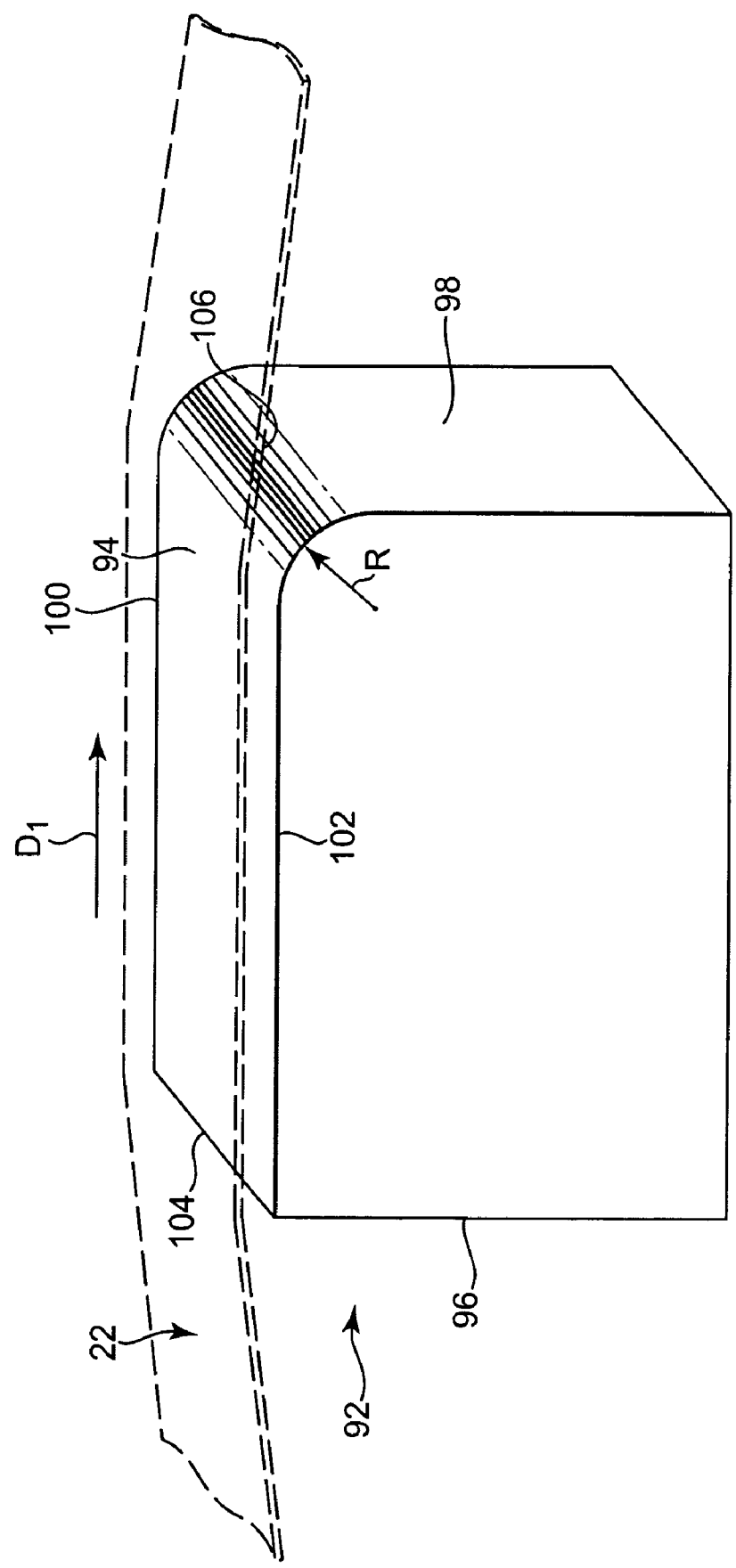
FIG. 4 is a perspective view of a support member of the edge processing system of FIG. 1.

Referring to FIG. 4, the support member 92 defines a top surface 94, a leading end 96, and a trailing end 98. In one embodiment, the top surface 94 is substantially planar and extends from the leading end 96 to the trailing end 98 and between a first edge 100 and a second edge 102. The top surface 94 defines a width that is substantially the same as the width of the tape 22, although other dimensions are contemplated. For example, the top surface 94 is optionally substantially wider than the tape 22. The leading end 96 and the top surface 94 are optionally substantially orthogonal relative to one another, defining a sharp edge 104. In turn, the top surface 94 and the trailing end 98 are optionally substantially orthogonal; however, in one embodiment, a round 106 is formed between the top surface 94 and the trailing end 98.

The top surface 94 extends a length of about 2 inches at a width that is substantially the same as the width of the magnetic recording tape 22, for example. The round 106 defines a radius of curvature of 0.001 inches or less, for example. It should also be understood that other dimensions are also acceptable.

Various manufacturing techniques are optionally employed to make the magnetic recording tape 22, including web coating, slitting, and tape cartridge assembly operations. For example, in one embodiment, a slitting operation is used to form the magnetic recording tape 22 at a desired tape width, or format width. During slitting, a stock roll (not shown) of tape material is optionally sheared to desired widths. Some slitting operations result in the formation of supported and unsupported slit edges. Generally, a supported slit edge rests on an anvil portion such as a lower rotary blade (not shown) of a slitting device (not shown) during slitting with a knife portion such as an upper rotary blade, while an unsupported slit edge is "free" or does not rest on an anvil portion. For example, in one embodiment, the first edge 50 is formed lengthwise along the tape 22 as a supported slit edge while the second edge 52 is formed lengthwise along the tape 22 as an unsupported slit edge. However, any combination of supported/unsupported edge formation, as well as alternate operations for forming the first and second edges 50, 52, is also contemplated.

Figure 5:
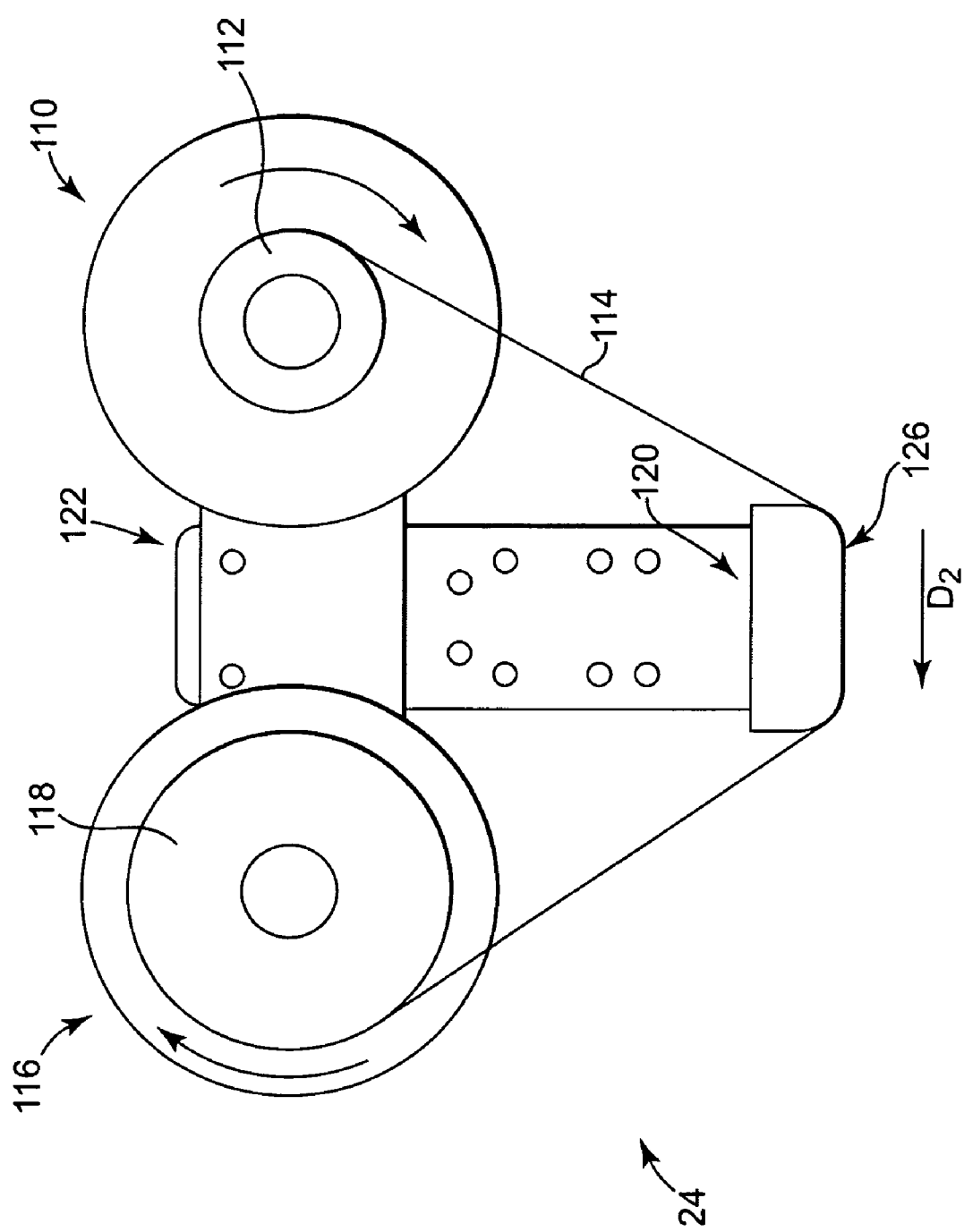
FIG. 5 is a plan view of an abrading assembly of the edge processing assembly of FIG. 1.

With reference to FIG. 5, the first abrading assembly 24 includes a first feed reel 110 maintaining a first feed roll 112 of a first abrasive film 114. The first abrading assembly 24 also includes a first take-up reel 116 maintaining a first take-up roll 118 of the first abrasive film 114. A first guide member 120 is centrally located relative to the first feed reel 110 and the first take-up reel 116. Additionally, a first frame 122 is included, the first frame 122 maintaining the first feed reel 110, the first take-up reel 116, and the first guide member 120 relative to one another.

The first abrasive film 114 has an associated abrasivity and can take a variety of forms. In one embodiment, the first abrasive film 114 is a lap film, or burnishing film. For example, a 15 micrometer grit lap film is optionally used, although other lap films are also contemplated, for example, about 0.5 to about 30 micrometer grit lap film.

The first guide member 120 defines a first guide surface 124 (FIG. 7) configured to slidably maintain the first abrasive film 114. In one embodiment, the first guide surface 124 is substantially planar. However, guide surfaces having other shapes, for example, rounded or substantially arcuate, are also contemplated.

In operation, the first feed reel 110 and the first take-up reel 116 rotate in the directions as indicated in FIG. 5 to deliver the first abrasive film 114 from the first feed roll 112, over the first guide member 120, and to the first take-up roll 118. As the first abrasive film 114 travels over the first guide member 120, and in particular the first guide surface 124, the first abrasive film 114 takes on the substantially planar shape of the first guide surface 124. As such, in one embodiment, the first abrasive film 114 travels over the substantially planar first guide surface 124 and, in turn, defines a substantially planar first abrasive surface 126 having a length and a width.

It should be noted that the first abrasive surface 126 is defined while the first abrasive film 114 is in motion and traveling linearly in a direction $D_2$ over the first guide surface 124, as well as when the first abrasive film 114 is stationary. Additionally, in embodiments where the first guide surface 124 takes another shape, such as a substantially arcuate shape, the abrasive film 114 defines a substantially arcuate first abrasive surface 126. When traveling across the first guide surface 24, the first abrasive film 114 travels at a speed of about 1 inch/minute to about 2 inches/minute, although other speeds are contemplated.

Figure 6:
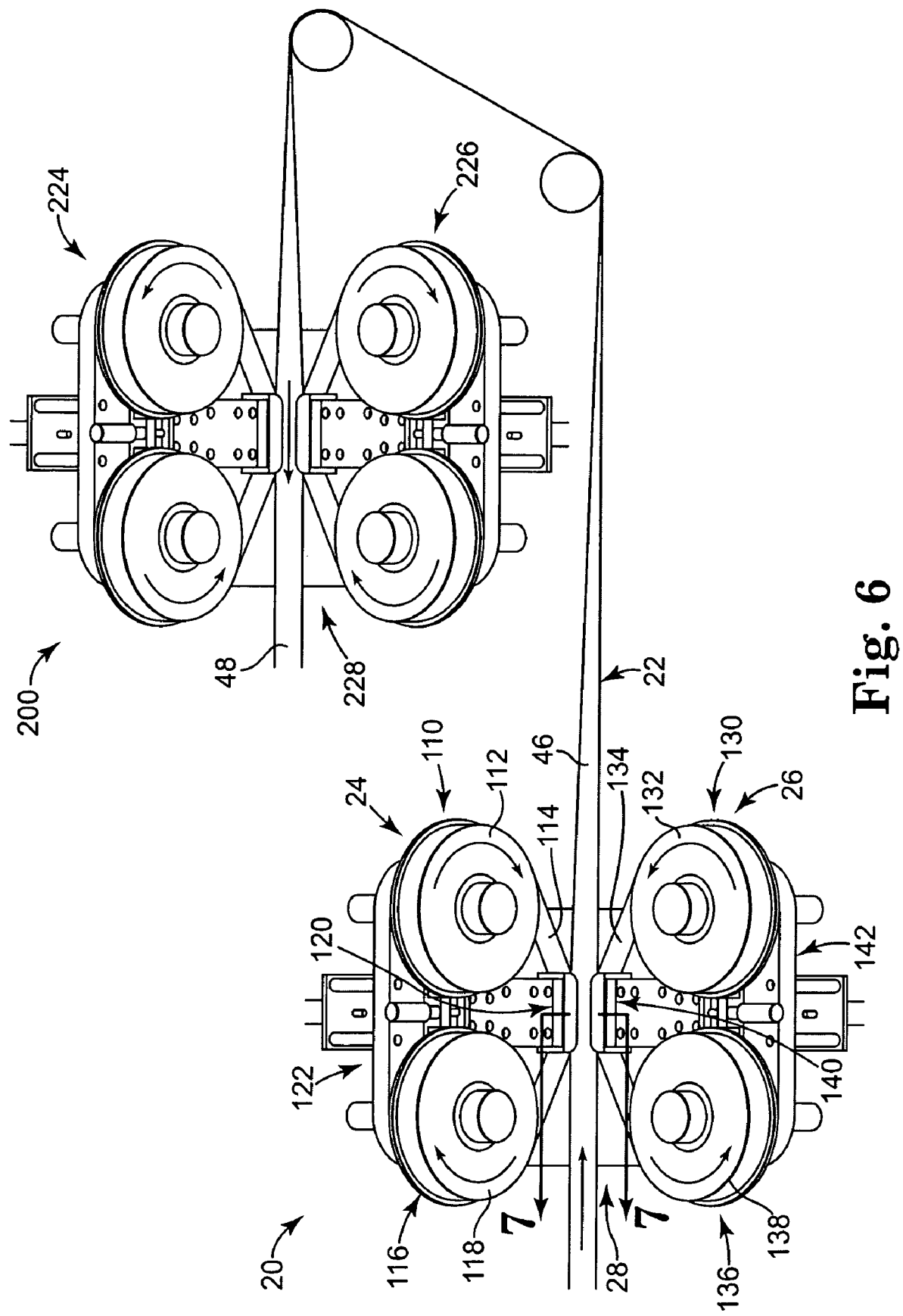
FIG. 6 is a top view of the edge processing system of FIG. 1 and a second edge processing system in accordance with principles of the present invention.

With reference to FIG. 6, the second abrading assembly 26 is substantially similar to the first abrading assembly 24. In particular, the second abrading assembly 26 includes a second feed reel 130 maintaining a second feed roll 132 of a second abrasive film 134 and a second take-up reel 136 maintaining a second take-up roll 138 of the second abrasive film 134. A second guide member 140 and a second frame 142 are also included; the second frame 142 maintaining the second feed reel 130, the second take-up reel 136, and the second guide member 140.

Figure 7:
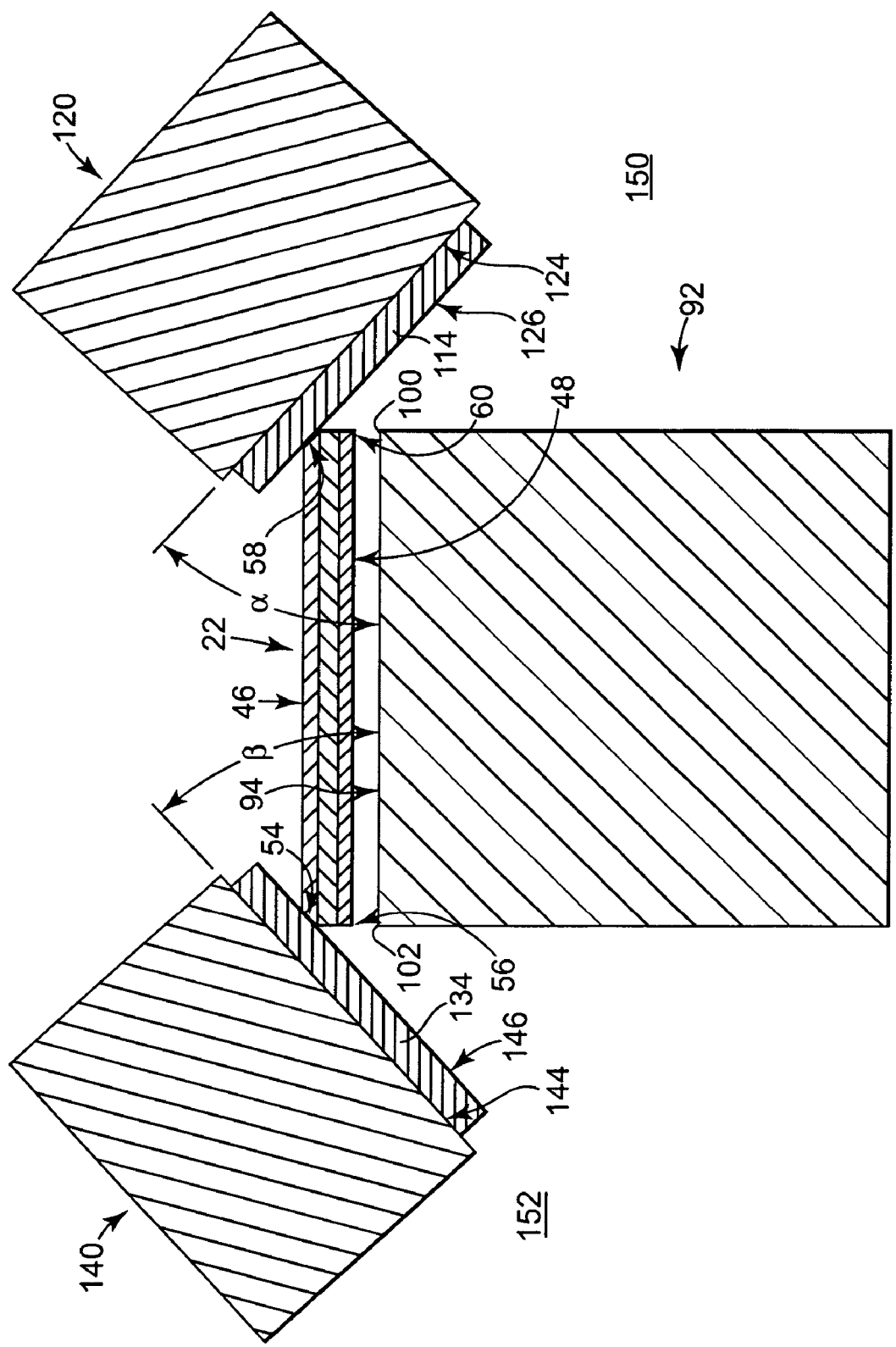
FIG. 7 is a cross-sectional view of the edge processing system of FIG. 1.

The guide member 140 also defines a second guide surface 144 (FIG. 7). In one embodiment, the second guide surface 144 is substantially planar. As the second abrasive film 134 travels over the second guide member 140, and in particular the second guide surface 144, the second abrasive film 134 defines a complementary shape to the second guide surface 144, for example, a substantially planar surface having a length and a width. Once again, the second abrasive surface 146 is defined by the second abrasive film 134 as it travels linearly in the direction $D_2$ over the second guide surface 124, or when the second abrasive film 134 is stationary. In one embodiment, the second abrasive film 134 travels at a speed of about 1 inch/minute to about 2 inches/minute, although other speeds are equally acceptable, including, for example, different speeds for each of the first and second abrasive films 114, 134.

In light of the above, a relative position of the above-described components of the edge processing system 20 is described. In general terms, the first abrading assembly 24 and the second abrading assembly 26 are opposingly related relative to the support member 92. With reference to FIG. 7, the first guide member 120 of the first abrading assembly 24 is positioned on a first side 150 of the support member 92, while the second guide member 140 of the second abrading assembly 26 is positioned in an opposing manner to the first guide member 120, on a second side 152 of the support member 92. As will be understood in greater detail below, the first and second guide members 120, 140 are positioned such that the first and second abrasive surfaces 126, 146 interfere with the top corners 54, 58 of the magnetic recording tape 22 as the tape 22 travels over the support member 92.

Each of the first and second guide members 120, 140, and in particular the first and second guide surfaces 124, 144, are substantially aligned to the support member 92 along the length of the support member 92 and/or along the tape direction $D_1$ of the magnetic recording tape 22 traveling over the support member 92. However, in one embodiment, the first guide surface 124 is laterally spaced from the first edge 100 of the support member 92, as well as angularly offset relative to the top surface 94 of the support member 92 at an angle α. In particular, the first guide surface 124 is neither parallel nor orthogonal to the top surface 94. In one embodiment, the second guide surface 144 is laterally spaced from the second edge 102 of the support member 92, as well as angularly offset relative to the top surface 94 of the support member 92 at an angle β. In particular, the second guide surface 144 is neither parallel nor orthogonal to the top surface 94.

In one embodiment, the first and second guide surfaces 124, 144 are each laterally offset from the first and second edges 100, 102, respectively. Additionally, both the first and second guide surfaces 124, 144 define opposing angular offsets of about 45 degrees from the top surface 94. From this, it should be understood that the first and second abrasive surfaces 126, 146 are also angularly offset from the top surface 94 to a substantially similar degree in some embodiments. It should also be understood that other dimensions, including other angles, are also contemplated With reference back to FIG. 6, a second edge processing system 200 is optionally disposed along the tape path of the tape 22 downstream from, and in-line with, the edge processing system 20. "In-line" is generally used in association with a substantially continuous web process, whereas "off-line" is used in association with separate web processes. In general terms, the second edge processing system 200 is optionally substantially similar to the edge processing system 20 and operates according to similar principles. In particular, the second edge processing system 200 includes a first abrading assembly 224, a second abrading assembly 226, and a tape support assembly 228.

A vacuum system (not shown) or other debris collection system is also optionally implemented following the first and/or second edge processing systems 20, 200. In particular, the vacuum system is used to collect and remove debris from the tape 22 prior to winding the magnetic recording tape 22 and disposing the tape 22 in a tape cartridge (not shown), for example.

With additional reference to FIG. 6, a method of processing the first and second edges 50, 52 of the tape 22 is described below. In general terms, the magnetic recording tape 22 travels between the first and second abrading assemblies 24, 26 with the back coat 44 toward the support assembly 28 of the edge processing system 20. In turn, the tape 22 optionally travels between the first abrading assembly 224 and the second abrading assembly 226 of the second edge processing system 200 with the front coat 42 toward the support assembly 228. In this manner, all four corners 54, 56, 58, 60 (FIG. 2) of the tape 22 are optionally processed in one, in-line operation.

With reference back to FIG. 4, the magnetic recording tape 22 (designated generally by dotted lines) is moved linearly in the direction $D_1$ at a tape speed over the support member 92 with the back face 48 (FIG. 2) toward the support member 92. In particular, the support member 92 is positioned to interfere with the path of the tape 22. As the tape 22 travels over the sharp edge 104 a boundary layer of air traveling with the tape 22 is sheared, resulting in a relatively high velocity of air flow over a relatively small gap between the tape 22 and the top surface 94 of the support member 92. Accordingly, a lower pressure layer of entrained air is created between the tape 22 and the support member 92. This negative pressure results in a down force between the tape 22 and the support member 92 such that the tape 22 tracks, or otherwise follows the top surface 94 of the support member while riding on the boundary layer, or thin layer of entrained air, forming an air bearing. In this manner, the tape 22 is substantially reinforced, strengthened, or otherwise supported in a substantially flat configuration as the tape 22 follows the top surface 94. In one embodiment, the tape 22 travels at a tape speed of about 8 meters/second over the top surface 94, although other rates are also acceptable.

The reinforcing effect between the magnetic recording tape 22 and the support member 92 assists in maintaining the tape 22 between the first and second abrading assemblies 24, 26. As described below, the first and second abrading assemblies 24, 26 engage the first and second edges 50, 52 (FIG. 2) of the tape 22, respectively, producing inward and/or downward forces at the tape edges 50, 52. The reinforcing effect helps to stabilize and support the tape 22 to reduce flexing or buckling caused by the inward and/or downward forces from the first and second abrading assemblies 24, 26 on the tape 22. In an absence of such reinforcement, the tape 22 is more likely to buckle and/or deflect an unacceptable amount, thereby reducing the efficacy of abrading operations performed with the system 20. It should be understood that some deflection at the first and second edges 50, 52 is optionally allowed. However, reinforcement of the tape 22 is particularly useful in some embodiments, for example, embodiments including relatively thin magnetic recording tapes. It should also be noted that other methods of reinforcing the tape 22 before, during, and/or after abrasion, including use of vacuum ports, rollers, or other methods are also contemplated and are optionally substituted or used in addition to the support member 92. It should also be understood that a similar reinforcing effect is optionally accomplished with the second edge processing system 200.

As the magnetic recording tape 22 travels between the first and second abrading assemblies 24, 26, the abrasive surfaces 126, 146 optionally selectively engage the top corners 54, 58 (FIG. 2) of the tape 22. For example, the first and second abrading assemblies 24, 26 optionally substantially simultaneously engage and abrade the top corners 54, 58. In particular, the abrasive surfaces 126, 146 are angularly offset relative to the top surface 94 of the support member 92. Additionally, the tape 22 is maintained in a substantially planar relationship to the top surface 94, as referenced above. As such, in one embodiment, the abrasive surfaces 126, 146 are also angularly offset relative to top face 46 of the tape 22 to angularly engage the first and second edges 50, 52 of the tape 22. In particular, the abrasive surfaces 126, 146 optionally selectively engage the tape 22 at the top corners 54, 58, rather than facing directly toward the first edge 50 and/or second edge 52.

During abrasion of the first and second edges 50, 52, the magnetic recording tape 22 is moved in the direction $D_1$ while the abrasive films 114, 134 are optionally both moved in the direction $D_2$. In one embodiment, the direction $D_2$ is substantially parallel, but opposite to $D_1$. As the abrasive films 114, 134 are moved, the abrasive surfaces 126, 146 are optionally continuously refreshed as new abrasive film 114, 134 is supplied from the feed rolls 112, 132.

As the magnetic recording tape 22 is abraded, a volume of material is removed from each of the top corners 54, 58 of the tape 22. The volume of material removed from the top corners 54, 58 is optionally altered according to such variables as: the tape speed of the tape 22 in the direction $D_1$; the speed of the abrasive films 114, 134 in the direction $D_2$; the abrasivity or grit of the abrasive surfaces 126, 146; the angular offsets of the abrasive surfaces 126, 146; the lateral offsets of the abrasive surfaces 126, 146 to the support member 92; and the length and width of the abrasive surfaces 126, 146, for example.

Figure 8:
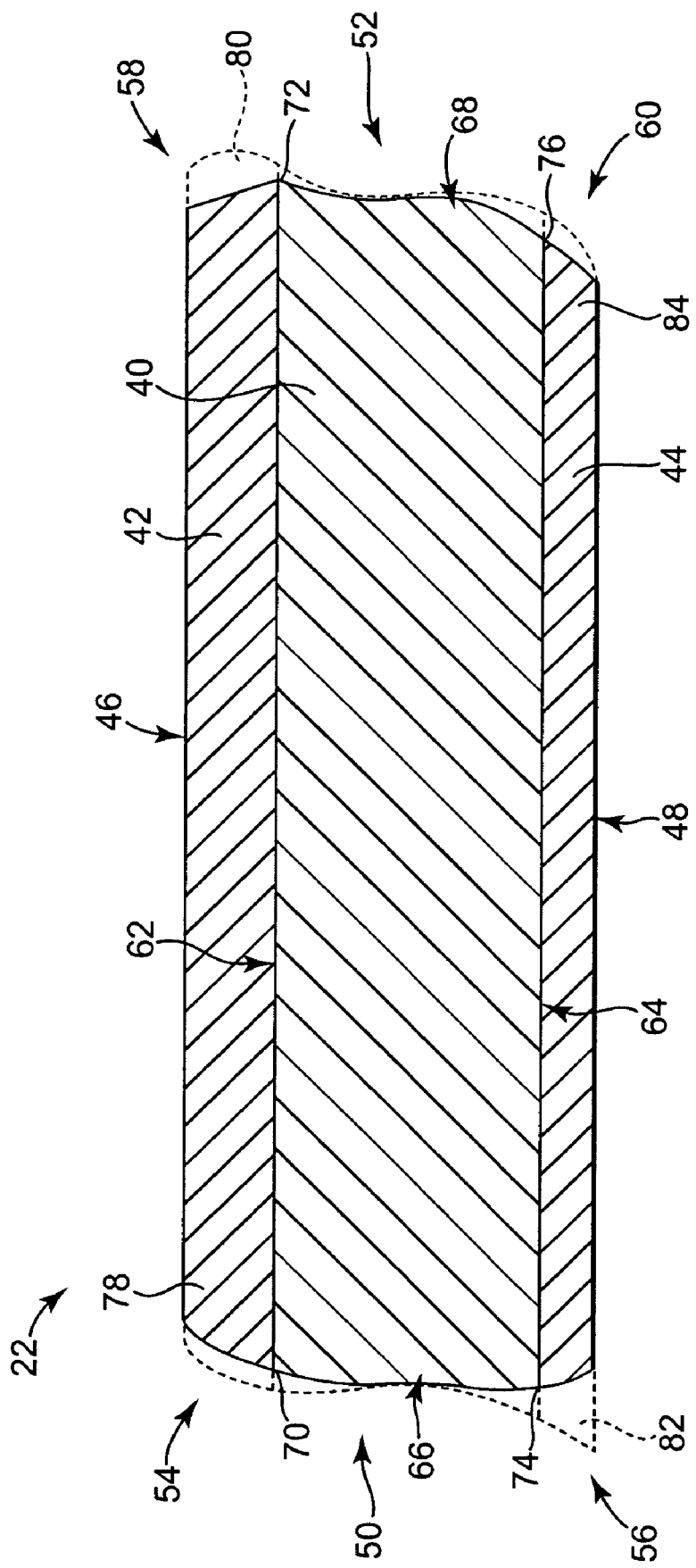
FIG. 8 is a cross-sectional view of a length of magnetic recording tape in accordance with principles of the present invention.

With reference to FIG. 8, the magnetic recording tape 22 is shown with volumes of material removed from the top corners 54, 58. For example, material removed from the top corner 58 includes the portion 80 (shown in dotted lines) of the front coat 42 protruding beyond the second terminal end 72 of the substrate 40. Material removed also optionally includes cracked portions of the front coat 42, along crack lines, for example. The material removed also optionally includes a volume of the substrate 40 proximate the top corners 54, 58. For example, at the top corner 58 a portion of the substrate 40 has been removed such that the terminal end 72 has been shifted and the front coat 42 does not protrude beyond the terminal end 72. The top corner 54 is also optionally abraded such that a volume of the substrate 40 proximate the terminal end 70 is removed. As shown generally in FIG. 8, removal of portions of the substrate 40 and/or front coat 42 at one or both of the top corners 54, 58 optionally smoothes, and/or rounds out, a profile of one or both of the first and second edges 50, 52 of the tape 22.

Along these lines, the front coat 42 is optionally reshaped to taper in thickness at an angle away from the first terminal ends 70, 72. Where the abrasive surfaces 126, 146 define angular offsets of about 45 degrees relative to the top face 46 of the tape 22, the taper 22 optionally defines angle of about 45 degrees relative to the top face 46. However, various taper angles are contemplated according to the principles previously described, as well as removal of the volumes of material from one or both of the top corners 54, 58 with planar tapers, rounded tapers, or even in the absence of such tapers.

The method of edge processing also includes abrading the bottom corners 56, 60 of the tape 22. The second edge processing system 200, or a second pass through the first system 20 are optionally implemented to abrade the bottom corners 56, 60 of the tape 22. In one embodiment, the bottom corners 56, 60 are simultaneously abraded, as referenced above in association with abrasion of the top corners 54, 58.

For example, FIG. 8 shows the tape 22 with material removed from the bottom corners 56, 60. The bottom corner 56 is optionally abraded such that the portion 82 (shown in dotted lines) of the back coat 44 protruding beyond the third terminal end 74 is removed and the terminal end 74 is shifted inward from a position shown in FIG. 2. In one embodiment, the back coat 44 is reshaped to taper angularly away from the third terminal end 74. As shown, with a sufficiently aggressive abrading operation, the substrate 40 proximate the third terminal end 74 is optionally reshaped and smoothed. In particular, the substrate 40 is reshaped to form a substantially continuous taper with the back coat 44 at the bottom corner 56.

Similar principles are implemented to abrasively remove the volume of material at the bottom corner 60. For example, the substrate 40 and/or the back coat 44 are optionally abraded and reshaped to smooth and/or round out the second edge 52 of the tape 22 proximate the bottom corner 60.

The vacuum system or vacuums systems (not shown) reside along the tape path following one or both of the edge processing systems 20, 200. The vacuum system or systems act to collect debris generated during abrasion of the top and/or bottom corners 54, 56, 58, 60, as well as debris from other sources. After the vacuum system or systems have removed a substantial amount of the debris, the tape is wound and assembled into a tape cartridge (not shown) as desired for use in a tape drive (not shown).

While the method of edge processing optionally abrades the top corners 54, 58 with the system 20 and abrades the bottom corners 56, 60 with the second edge processing system 200, it should be noted that the tape 22 is optionally flipped such that the system 20 abrades the bottom corners 56, 60, while the second edge processing system 200 abrades the top corners 54, 58. It should also be noted that the system 20 and/or the second edge processing system 200 are optionally disposed in-line with a coating operation and/or a slitting operation such that coating and/or slitting and edge processing occur as a substantially continuous process. Additionally, it should also be understood that some embodiments include omitting the second edge processing system 200 and/or taking the one or both of the edge processing systems 20, 200 off-line.

Figure 9:
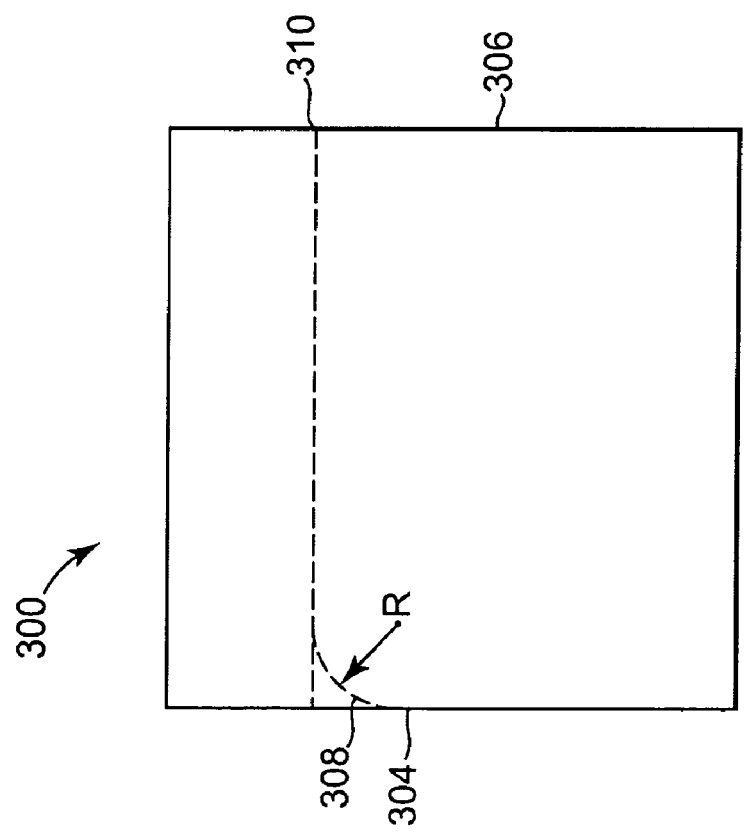
FIG. 9 is a side view of another support member in accordance with principles of the present invention.

With reference to FIG. 9, another support member 300 in accordance with principles of the present invention is shown. In general terms, the support member 300 is optionally used in the edge processing systems 20, 200 as desired. The support member 300 is adapted to be secured to the frame member 90 (FIG. 3) and defines a substantially arcuate top surface 302 (FIG. 10), a leading end 304, and a trailing end 306. The substantially arcuate top surface 302 defines a substantially concave shape in transverse cross-section and extends a length of about 3 inches, with a radius of a curvature of about 2 inches, although other dimensions are equally acceptable.

Figure 10:
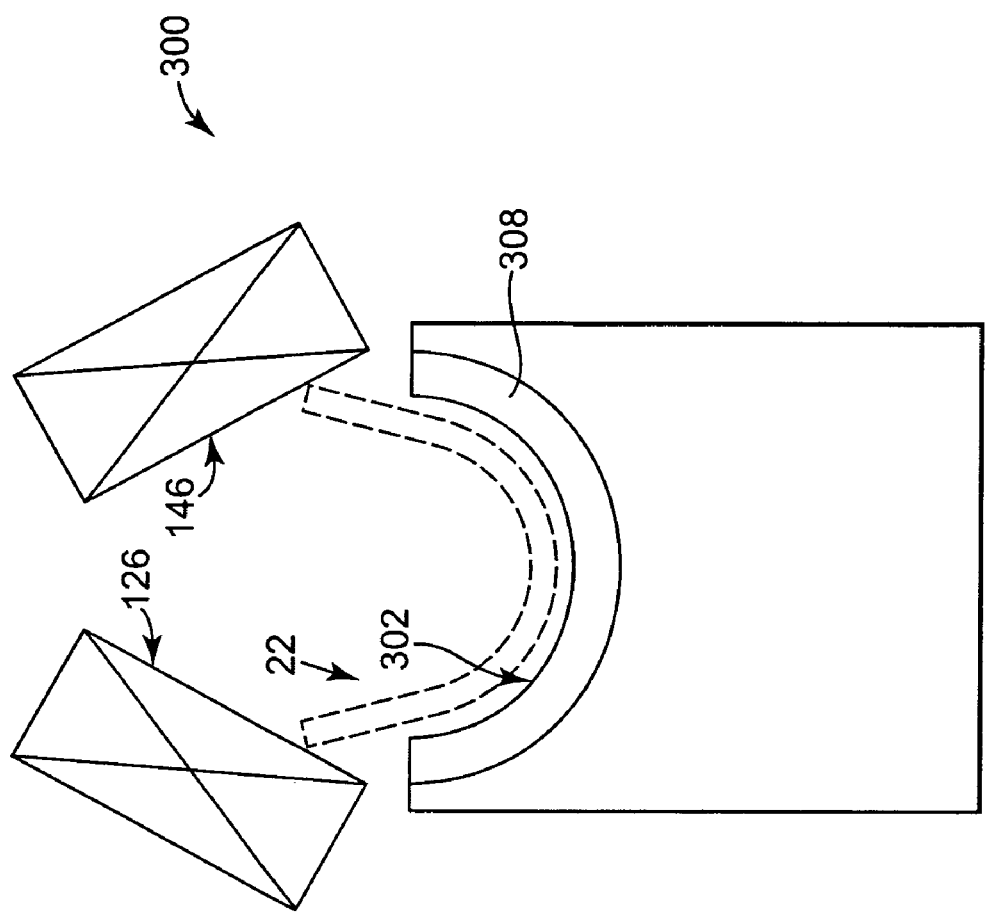
FIG. 10 is a front view of the support member of FIG. 9.

The leading end 304 and the top surface 302 define a leading edge 308 rounded at a radius R. In turn, a trailing edge 310 is formed opposite the rounded edge 308 and is optionally rounded or sharp as desired. With reference to FIGS. 9 and 10, the tape 22 (shown by dotted lines) travels in the direction $D_1$ (into the page according to the view of FIG. 10) over the top surface 302. In one embodiment, the top surface 302 is substantially arcuate in a plane orthogonal to the tape travel direction $D_1$ and defines a radius of curvature. As shown, the tape 22 also defines a substantially arcuate transverse profile, or substantially arcuate profile in the plane orthogonal to the tape travel direction $D_1$, as it substantially mirrors the shape of the top surface 302. In particular, the arcuate shape of the top surface 302 engenders a Coanda Effect which has a similar reinforcing effect to that previously described, causing a down force on the tape 22 as it rides on a thin layer of negative pressure entrained air. This causes the tape 22 to follow the top surface 302 and to take an arcuate profile. This lower pressure air bearing assists in reinforcing a position and/or shape of the tape 22 to prevent buckling and/or displacement as the tape 22 is engaged by abrasive surfaces 126, 146 (designated generally in FIG. 10). The radius of curvature of the top surface 302 and the width of the tape 22 define a ratio. In one embodiment, the radius of curvature of the top surface 302 is selected such that the ratio of the radius of curvature of the top surface 302 to the width of the tape 22 is between about 0.4 and about 2.3.

In light of principles of the present invention understood with reference to systems and methods for edge processing described herein, several advantages in tape quality and functionality are realized as desired. For example, portions of the relatively hard front and/or back coats 42, 44 that protrude beyond the terminal ends 70, 72, 74, 76 of the substrate 40 contribute to the abrasiveness of the first and second edges 50, 52 of the tape 22. Additionally, such protruding portions can break off when rubbing against drive components, for example, resulting in increased debris during tape use. By removing such portions using tape edge processing systems and methods according to principles of the present invention, tape wear on drive components and/or debris is reduced. Cracks in the front and/or back coats 42, 44 proximate the tape edges 50, 52 also can also increase abrasivity of the tape edges 50, 52. Additionally, portions of the front and/or back coats 42, 44 proximate such cracks are susceptible to breaking off, creating even more debris. By abrading the tape edges using edge processing systems and methods according to principles of the present invention, edge cracking is also optionally reduced, thereby reducing tape wear on drive components and/or debris.

As referenced above, abrading one or more of the corners 54, 56, 58, 60 of the tape 22 removes coating protrusions and/or reduces or eliminates surface cracks proximate the tape edges 50, 52, thereby reducing drive component wear and/or debris in the tape drive. Additionally, abrading, or "grooming" the edges facilitates improved tape tracking in tape drives. In particular, more uniform tape edges allow more controlled tracking of the magnetic recording tape 22 in the tape drive. Thus, tape edge processing systems and methods according to principle of the present invention achieve reduced debris, reduced wear, and better tracking of magnetic recording tape in the tape drive.

In the detailed description, reference has been made to the drawings showing embodiments in which the invention may be practiced. Although specific embodiments and associated advantages have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method for manufacturing magnetic recording tape, the method comprising:

applying a front coat including a magnetic component to a substrate to provide a coated substrate, the coated substrate defining a first face and an opposing, second face, the first face extending between a first corner and an opposing, second corner, and the second face extending between a third corner and an opposing, fourth corner; and moving an abrasive surface against the first corner of the coated substrate to abrasively remove a volume of material from the first corner;

wherein the abrasive surface is angularly offset at a non-orthogonal angle from the first face of the coated substrate.

2. The method of claim 1, wherein abrading the coated substrate with the abrasive surface includes:

continuously replenishing the abrasive surface.

3. The method of claim 1, wherein the abrasive surface includes a lap film.

4. The method of claim 1, wherein abrading the coated substrate with the abrasive surface includes:

moving the abrasive surface substantially linearly against the coated substrate.

5. The method of claim 1, wherein abrading the coated substrate with the abrasive surface includes:

contacting the abrasive surface with the coated substrate proximate the first corner;
moving the abrasive surface in a first direction; and
moving the coated substrate in a second, opposite direction.

6. The method of claim 1, wherein the front coat defines the first face of the coated substrate, the method further comprising:
reshaping the front coat to define a taper in thickness at the first corner.

7. The method of claim 1, wherein abrading the coated substrate with the abrasive surface further includes:
abrasively removing a volume of the substrate proximate the first corner.

8. The method of claim 1, further comprising:
abrading the coated substrate with a second abrasive surface angularly offset from the first face of the coated substrate to remove a volume of material from the second corner of the coated substrate.

9. The method of claim 8, wherein the first and second corners are abraded substantially simultaneously.

10. The method of claim 1, further comprising:
moving the coated substrate over a top surface of a support member to generate a negative pressure layer of entrained air between the coated substrate and the top surface to form an air bearing; and
supporting the coated substrate against the first abrasive surface using the air bearing.

11. The method of claim 10, wherein the top surface is substantially planar.

12. The method of claim 10, wherein the top surface is substantially concave in a plane orthogonal to the movement of the coated substrate over the top surface.

13. The method of claim 1, further comprising:
slitting the coated substrate to a desired width,
wherein slitting the coated substrate and abrading the coated substrate are performed as an in-line process.

14. A method of forming a length of magnetic recording tape, the method comprising:
coating a substrate with a coating to provide a coated substrate, the coated substrate being adapted to record and defining a length, a top face, and an opposing, bottom face;
cutting the coated substrate to form a first edge along the length of coated substrate and a second edge along the length of the coated substrate; and
abrading the first edge with a moving abrasive surface disposed at a non-orthogonal angle to the top face of the coated substrate, including removing a volume of the coating proximate the first edge.

15. The method of claim 14, wherein abrading the first edge further includes removing a volume of the substrate proximate the first edge.

16. The method of claim 14, further comprising:
abrading the second edge at a substantially non-orthogonal angle to the top face of the coated substrate;
wherein the first edge and the second edge are abraded substantially simultaneously.

17. A method for manufacturing magnetic recording tape, the method comprising:
applying a front coat including a magnetic component to a substrate to provide a coated substrate, the coated substrate defining a first face and an opposing, second face, the first face extending between a first corner and an opposing, second corner, and the second face extending between a third corner and an opposing, fourth corner;
moving a first abrasive surface against the first corner of the coated substrate to abrasively remove a volume of material from the first corner, wherein the first abrasive surface is disposed at a non-orthogonal angle to the first face; and
moving a second abrasive surface against the second corner to abrasively remove a volume of material from the second corner, the first and second abrasive surfaces being separate from one another.

* * * * *

UNITED STATES PATENT AND TRADEMARK OFFICE
CERTIFICATE OF CORRECTION

PATENT NO.       : 7,597,607 B2                                Page 1 of 1
APPLICATION NO.  : 11/403308
DATED            : October 6, 2009
INVENTOR(S)      : Plourde et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 81 days.

Signed and Sealed this

Twenty-eighth Day of September, 2010

David J. Kappos
*Director of the United States Patent and Trademark Office*